Sept. 16, 1958  W. B. WESTCOTT, JR  2,851,995
LOCK MECHANISM
Filed July 20, 1955

INVENTOR.
WILLIAM B. WESTCOTT, Jr.
BY
ATTORNEY

United States Patent Office 2,851,995
Patented Sept. 16, 1958

2,851,995
LOCK MECHANISM
William B. Westcott, Jr., Cleveland Heights, Ohio, assignor to Cleveland Pneumatic Industries, Inc., a corporation of Ohio Application July 20, 1955, Serial No. 523,295
6 Claims. (Cl. 121—40)

This invention relates generally to a lock mechanism and more particularly to a new and improved locking device adapted for use in actuators and the like to prevent axial motion between two axially movable fluid operated members.

It is an important object of this invention to provide a lock mechanism particularly adapted for use with fluid operated pistons and cylinders to prevent axial motion therebetween.

It is another important object of this invention to provide a new and improved lock mechanism which prevents axial motion in both directions between two axially slidable members.

It is a still a further object of this invention to provide a lock mechanism to prevent axial motion between a piston and a cylinder wherein possible fatigue failures are eliminated.

It is still another object of this invention to provide a fluid operated lock mechanism for use in preventing axial motion between a piston and cylinder wherein the load stresses on the locking mechanism are carried only by rigid elements.

Further objects and advantages will appear from the following description and drawings, wherein.

In some installations of fluid operated pistons and cylinders, it is necessary to provide mechanical locking means which prevent axial motion between the piston and cylinder when they are in a predetermined position and fluid under pressure is not supplied to the device. A locking mechanism according to this invention is particularly adapted for such installations.

Figure 1:
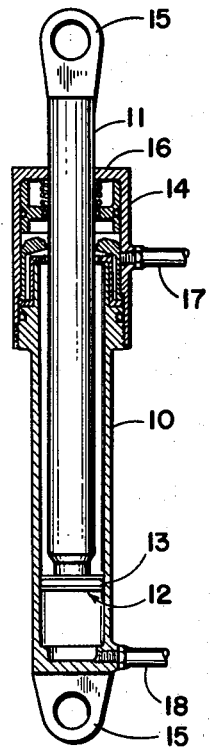
Figure 1 is a side elevation in longitudinal section showing a piston and cylinder actuator incorporating a lock mechanism according to this invention.

In Figure 1 a complete piston and cylinder actuator is shown which includes a cylinder 10 and a cooperating piston rod 11 axially slidable relative thereto. The cylinder 10 and piston rod 11 are formed with mounting lugs 15 which are adapted to be connected to an external load. A piston 12, formed on the inner end of the piston rod 11, is provided with a resilient seal 13 which prevents fluid leakage between the piston 12 and the cylinder 10. An end cap 14 is threaded onto the cylinder 10 and is formed with an inwardly projecting flange 16 which engages the piston rod 11 and prevents lateral motion between the piston rod and cylinder. An upper pressure line 17 provides fluid communication with the upper side of the piston 12 and a lower pressure line 18 provides fluid communication with the lower side of the piston 12. These lines are adapted to be connected to a source of fluid under pressure through a suitable control means which will supply pressurized fluid to one or the other sides of the piston to produce the desired actuation.

Figure 2:
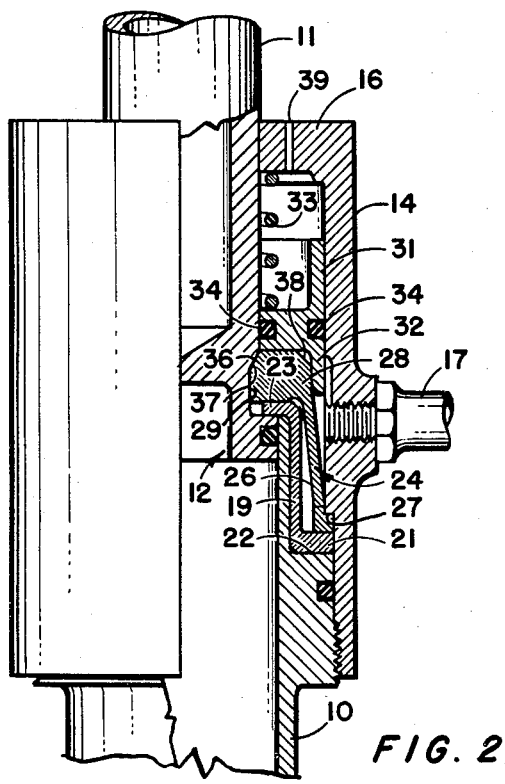
Figure 2 is an enlarged fragmentary view partially in longitudinal section showing a lock mechanism in the locking position preventing relative axial motion between the piston and cylinder.
Figure 3:
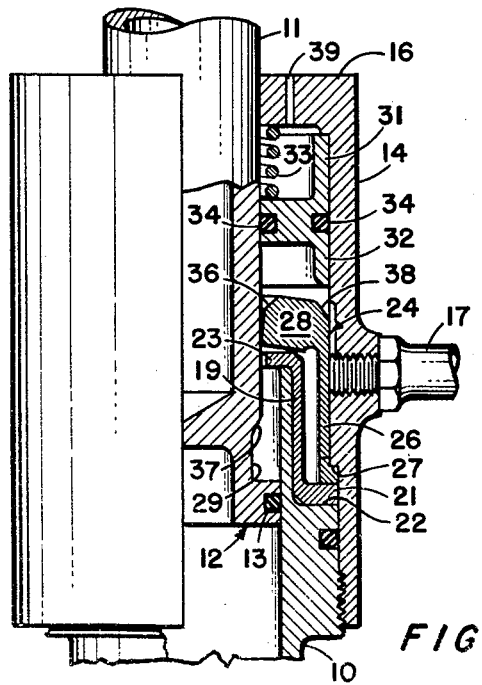
Figure 3 is a view similar to Figure 2 showing the position of the elements when the lock mechanism is released; and, Figure 4 is a perspective view, partially in section, of the lock sleeve showing the structural details of the locking fingers.
Figure 4:
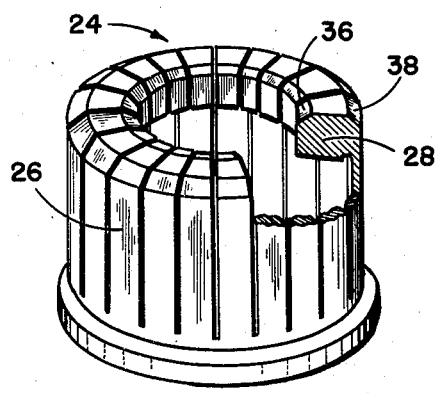

Reference should now be made to Figures 2 through 4 for the structural details of the lock mechanism utilized to prevent axial motion between the piston and cylinder. A stop sleeve 19 is formed with an outwardly extending flange 21 which is seated against a shoulder 22 formed on the cylinder 10 and an inwardly extending flange 23 adapted to engage the end of the piston 12 and limit upward movement of the piston relative to the cylinder 10 at the upper end of the stroke. A lock sleeve 24 formed with axially extending laterally spaced fingers 26 that cooperate to form an annulus around the piston rod 11 is axially positioned against the flange 21 by a shoulder 27 formed in the end cap 14. The fingers 26 are formed with an intermediate resilient section and inwardly extending or depending bead or end portions 28 which are adapted to fit into an annular groove 29 formed in the piston rod 11 when the piston 12 engages the flange 23.

A latch member 31 formed with an axially extended skirt portion 32 is slidably positioned within the cap member 14 and is adapted to securely hold the end portions 28 in the groove 29 when it is in the position shown in Figure 2. A spring 33 extends between the latch member 31 and the flange 16 and resiliently urges the latch member 31 to this position. Seals 34 mounted on the latch member 31 prevent fluid leakage between it and both the cap member 14 and piston rod 11. The end portions 28 are formed with an inclined surface 36 which cooperates with a corresponding inclined surface 37 formed on the piston rod 11 adjacent to the groove 29 to prevent axial motion of the piston rod downward relative to the cylinder when the end portions are positioned in the groove and secured in place by the latch member 31. The end portions 28 are in engagement with the flange 23 at this time so any axial force transmitted through the inclined surfaces 36 and 37 is absorbed by the flange 23.

The fingers 26 are preferably formed so that they assume the released position shown in Figure 3 when they are unstressed at which time the end portions are not positioned within the groove 29. Therefore the end portions 28 are formed with a camming surface 38 adapted to engage the end of the skirt 32 so that the end portions will be cammed into the groove 29 by the force of the spring 33.

In operation when fluid under pressure is supplied to the lower side of the piston 12 through the lower pressure line 18, a reaction force is produced on the piston which moves it upward relative to the cylinder 10 until it engages the flange 23 which limits the upward movement of the piston. At this time the upper pressure line 17 is connected to a reservoir return and the fluid above the piston 12 is automatically exhausted from the cylinder 10. As soon as the piston 12 engages the flange 23, the end portions 28 are cammed into the groove 29 by the latch member 31 due to the force of the spring 33. The elements are then in the position shown in Figure 2 and the piston is mechanically locked against axial motion relative to the cylinder in both directions. Therefore the fluid under pressure may be relieved from the lower side of the piston and the piston will remain in the locked position. Any force on the piston rod, produced by the connected load, tending to move it downwardly relative to the cylinder is transmitted by the two inclined surfaces 36 and 37 through the end portions 28 directly to the flange 23. Therefore there are no compressive stresses carried by the fingers 26 and fatigue failures will not occur. Of course, any forces tending to move the piston rod 11 upward relative to the cylinder 10 are transmitted direct to the flange 23, so again no stresses are transmitted through the fingers 26. Because the stop sleeve 19 is formed with a continuous annular flange, it is able to withstand the stresses even when there is repeated loading while the fingers because of their relatively thin cross section would be unable to withstand repeated loadings over a long period of time.

When it is desired to operate the actuator so that the piston will move away from the locked position shown in Figure 2 downwardly relative to the cylinder 10, the fluid under pressure is supplied to the upper pressure line 17 which introduces the fluid under pressure to the upper side of the piston 12 and also to the lower side of the latch member 31. This causes the latch member 31 to move axially upward relative to the cap member 14 against the force of the spring 33 until the skirt 32 clears the end portions 28. At the same time a reaction force is developed on the piston 12 urging it downwardly relative to the cylinder 10. The natural resilience of the fingers 23 tends to move the end portions 28 out of the groove 29 to the position shown in Figure 3. This motion is assisted by the camming action of the inclined surfaces 36 and 37 produced by the reaction force on the piston 12. It is preferable to provide the inclined surfaces so that the force on the piston will assist in camming the end portions 28 out of the groove 29. If purely radial surfaces were utilized for the engagement between the piston rod and the end portions 28, there would be a tendency for binding to occur which would prevent the finger 26 from lifting the end portions 28 out of the groove 29. Also in some applications it may be desirable to form the fingers so that the unstressed position is the locked position and in such case the inclined surfaces 36 and 37 will automatically move the end portions out of the groove 29 when the pressure is supplied.

Because the resilient fingers 26 are not subjected to axial loading in either direction in a lock mechanism according to this invention, fatigue failures do not occur and it is possible to reduce the cross section of the fingers so that they are very flexible and lighter in weight. Those skilled in the art will therefore recognize that a lock mechanism according to this invention will provide a much longer service life without breakage occuring in the fingers 26.

A port 39 may be formed in the flange 16 to vent the chamber above the latch member 31 to prevent the build up of pressure. However in many cases the leakage between the piston rod 11 and the flange 16 will be sufficient for this purpose.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described a pair of telescoping members each formed with engageable stop surfaces to limit relative axial motion of said members in one direction, a recess on one of said members, a locking element axially fixed relative to the other of said members, a head on said element adapted to fit into said recess and engage the walls thereof preventing relative axial motion between said members in a direction opposite to said one direction, said head and said other member being formed with mutually engageable surfaces adjacent to said recess adapted to engage when said detent is in said recess and prevent relative axial motion therebetween in said opposite direction, and releasable means adapted to hold said head in said recess.

2. In a device of the character described a pair of telescoping members each formed with engageable stop surfaces to limit relative axial motion of said members in one direction, a recess on one of said members, a locking element axially fixed relative to the other of said members, a solid head on said element adapted to fit into said recess and engage the walls thereof preventing relative axial motion between said members in a direction opposite to said one direction, said head means and said other member being formed with mutually engageable surfaces adjacent to said recess adapted to engage when said head is in said recess and prevent relative axial motion therebetween in said opposite direction, spring biased locking means adapted to hold said head in said recess, and means adapted to supply pressure fluid to said locking means to effect release of said head.

3. In a device of the character described a pair of telescoping members each formed with mutually engageable stop surfaces to limit relative axial motion therebetween in one direction, a groove in one of said members, a sleeve axially fixed to the other of said members formed with a plurality of flexible axially extending fingers each having a laterally extending end portion adapted to fit into said groove and prevent relative axial motion therebetween in a direction opposite to said one direction when said end portions are in said groove, said end portions and said other member being formed with surfaces engageable to prevent axial motion therebetween in said opposite direction whereby axial stresses are not transmitted along said fingers, and means adapted to hold said end portions in said groove.

4. In a device of the character described inner and outer telescoping members each formed with mutually engageable stop surfaces to limit relative axial motion therebetween in one direction, a groove on said inner member, a sleeve axially fixed to said outer member formed with a plurality of flexible axially extending fingers each having a laterally extending end portion adapted to fit into said groove and prevent relative axial motion therebetween in a direction opposite to said one direction when said end portions are in said groove, said end portions and said outer member being formed with surfaces engageable to prevent axial motion therebetween in said opposite direction whereby axial stresses are not transmitted along said fingers, and means adapted to hold said end portions in said groove.

5. In a device of the character described a pair of telescoping members each formed with mutually engageable stop surfaces to limit relative axial motion therebetween in one direction, an annular groove in one of said members, a sleeve axially fixed to the other of said members formed with a plurality of flexible axially extending fingers each having a laterally extending end portion cooperating to form an annulus adapted to fit into said groove when said stop surfaces engage, said groove and end portions being formed with surfaces adapted to engage and prevent relative axial motion therebetween in a direction opposite to said one direction when said end portions are in said groove, said end portions and said other member being formed with surfaces engageable to prevent axial motion therebetween in said opposite direction whereby axial stresses are not transmitted along said fingers, and means adapted to hold said end portions in said groove.

6. In a device of the character described a cylinder member, a cooperating fluid actuated piston member in said cylinder member capable of axial motion relative thereto, each of said members being formed with mutually engageable stop surfaces which upon such engagement limit relative axial motion therebetween in one direction, an annular groove in said piston member, a sleeve axially fixed relative to said cylinder member formed with a plurality of flexible axially extending fingers each having an end portion cooperating to form an annulus around said piston member adapted to fit into said groove when said stop surfaces engage, means adapted to hold said end portions in said groove, said groove and end portions being formed with surfaces adapted to engage and prevent relative axial motion therebetween in a direction opposite to said one direction when said end portions are in said groove, said end portions and cylinder member being formed with surfaces engageable to prevent axial motion therebetween in said opposite direction whereby axial stresses are not transmitted along said fingers.

References Cited in the file of this patent

UNITED STATES PATENTS

| | | |
|---|---|---|
| 2,221,979 | Levy | Nov. 19, 1940 |
| 2,297,902 | Levy | Oct. 6, 1942 |
| 2,685,275 | Caldwell | Aug. 3, 1954 |